United States Patent
Cohen

(10) Patent No.: US 7,279,675 B2
(45) Date of Patent: Oct. 9, 2007

(54) FLOATING PERISCOPE

(75) Inventor: Yosef Cohen, Nahariya (IL)

(73) Assignee: Rafael-Armament Development, Haifa (IL)

( * ) Notice: Subject to any disclaimer, the term of this patent is extended or adjusted under 35 U.S.C. 154(b) by 208 days.

(21) Appl. No.: 11/203,912

(22) Filed: Aug. 15, 2005

(65) Prior Publication Data
US 2006/0209401 A1    Sep. 21, 2006

(30) Foreign Application Priority Data
Aug. 16, 2004   (IL) ..................................... 163564

(51) Int. Cl.
*G02B 23/08* (2006.01)
*H01J 3/14* (2006.01)
(52) U.S. Cl. ..................... 250/234; 250/216; 348/81; 359/402
(58) Field of Classification Search ............... 250/234, 250/236, 216, 221; 348/36, 81, 124, 143, 348/375; 359/402, 403, 405, 406
See application file for complete search history.

(56) References Cited

U.S. PATENT DOCUMENTS 6,731,845 B1 * 5/2004 Gerdt ......................... 385/116
2003/0020829 A1   1/2003 Croasdale

* cited by examiner

*Primary Examiner*—Kevin Pyo
(74) *Attorney, Agent, or Firm*—Arent Fox LLP

(57) ABSTRACT

A submarine floating periscope comprising: (a) a floating base; (b) a scanning unit for scanning and acquiring images, and; (c) cables between the submarine and the periscope for maintaining the periscope in the vicinity of the submarine, and for enabling communication between the periscope and the submarine. The scanning unit comprises: (i) a transparent dome; (b) a two-degrees of freedom gimbals system in a hollow portion below the dome. The gimbals system includes a mechanism for changing the orientation of a plate within the hollow portion by applying rotation about two perpendicular axes; (c) a light sensing element, for sensing light coming from outside the dome thereby forming images, the sensing unit being positioned on said plate, preferably in its center; and (d) a modem for transferring images data and other data between the periscope and the submarine.

19 Claims, 3 Drawing Sheets

FLOATING PERISCOPE

CROSS REFERENCE TO RELATED APPLICATION

The present application claims benefit under 35 U.S.C. § 119 to Israeli Patent Application No. 163564 filed Aug. 16, 2004, the disclosure of which is hereby incorporated by reference in its entity.

FIELD OF THE INVENTION

The present invention relates generally to a periscope system used by submarines. In particular, the present invention relates to a periscope that is deployed from a submarine and floats above the water's surface. More particularly, the present invention relates to a periscope that acquires images of its surroundings and transmits these images to a remote workstation.

BACKGROUND OF THE INVENTION

Periscopes are well known and widely used by submarine crews. When submarines are fully submerged under water, the crew uses a periscope to determine the above water surroundings of the submarine. The information that is obtained by the use of the periscope can be extremely valuable. Firstly, determining whether there are friendly or enemy vessels above the submarine is essential for the crew to be aware of for obvious reasons. Additionally, when the crew is interested in surfacing the submarine, they must be certain that there are no vessels floating above the water into which the submarine might collide.

There are numerous drawbacks that are associated with conventional periscopes. Periscopes are contained inside a periscope well within the ship's sail, the cylindrical chamber attached to the top of the submarine. A periscope well is required to run the entire height of the submarine in order to house the periscope. This restricts the arrangement of the sail and interior compartments. Furthermore, periscopes can accommodate only one person at a time. Additionally, the construction of periscopes is mechanically complicated, they add extra weight to the already heavily loaded submarine and they take a long time to rise to the surface.

US Publication No. 2003/0020829 attempts to overcome some of the drawbacks associated with conventional periscopes. The application describes a lengthy photonic buoy that is deployed from a submarine. An optical bench is positioned at the top of the buoy, in the section that floats above the waterline. The optical bench contains an imager which captures surface imagery and transmits it back to a remote workstation, located within the submarine, via fiber-optic cable. One limitation of this device is that due to the arrangement of the imager, the system is configured to provide only a panoramic view of the horizon. This includes essentially only a view of surface level objects, such as ships or land, not objects located above the surface level, such as flying vehicles.

It is therefore an object of the present invention to provide a periscope that overcomes the limitations of the prior art devices.

It is another object of the present invention to provide a periscope that provides a view of not only the surface level, but even above surface level objects.

It is still another object of the present invention to provide a periscope that transmits images to a remotely located workstation without the use of cable transfer lines.

It is still an object of the invention to use a tracking head of a missile as a submarine periscope, by sending the missile enclosed within its capsule to the water surface.

It is still another object of the present invention to use the images as obtained from the missile head as means for controlling other armament system within the submarine.

Other purposes and advantages of the invention will appear as the description proceeds.

SUMMARY OF THE INVENTION

The present invention relates to a floating periscope for a submarine which comprises: (a) a floating base; (b) a scanning unit for scanning and acquiring images of the above water surface hemisphere, and; (c) cables between the submarine and the periscope for maintaining the periscope above water and in the vicinity of the submarine, and for enabling communication between the periscope and the submarine; The scanning unit is characterized by comprising in combination: (I) a transparent dome; (II) two-degrees of freedom gimbals system positioned in the hollow formed below said dome, the gimbals system comprising mechanism for changing the orientation of a plate within said hollow by applying rotation about two perpendicular axes both being essentially parallel to the water surface; (III) a light sensing element in the form of a focal plane array, for sensing light coming from outside the dome thereby forming images, the sensing unit being positioned on said plate, preferably in its center; and (IV) a modem for transferring images data and other data between the periscope and the submarine.

Preferably, the gimbals system further comprises a frame, surrounding said plate.

Preferably, said gimbals system provides to the said frame and said plate movement in the following degrees of freedom: (a) rotation of said frame and said plate together about a first axis x parallel to the water surface; (b) rotation of said plate only about a second axis z perpendicular to said axis x, and also parallel to the water surface;

Preferably, the gimbals system has a third degree of freedom, i.e., rotation about a third axis y, essentially perpendicular to the water surface.

Preferably, the modem transfers data over a fiber-optic channel within said cable connecting the submarine and the periscope.

Preferably, the modem transfers data to the submarine wirelessly, in the ultrasonic range.

Preferably, the focal plane array is in contact with and parallel to the plate.

Preferably, said acquired images are displayed in a workstation within the submarine.

Preferably, said scanning unit has essentially the same configuration as that of a conventional missile head.

Preferably, the base is surrounded by a floatation tube.

Preferably, a directional stabilizing system is affixed to the base or the scanning unit, in order to acquire and transmit to the submarine direction and orientation data, together with the transmitted images.

Preferably, said directional and orientation data is also used for compensating the acquired images for vibrations due to environmental conditions occurred during imaging by the scanning unit, or for providing compensation within the gimbals system for said vibrations.

Preferably, wherein the dome is a portion of a sphere.

Preferably, the transparent dome is made of a sapphire.

Preferably, the periscope is a tracking head of a missile, and is an integral potion thereof.

Preferably, the missile, including the periscope being the tracking head thereof is included within a capsule.

Preferably, the capsule further includes launching means for launching the missile.

Preferably, the capsule has a top transparent cover, or a retractable cover which is retracted when the periscope is operative.

Preferably, the missile can be launched from the capsule following a command given by an operator located within the submarine.

DETAILED DESCRIPTION OF PREFERRED EMBODIMENTS

Figure 1:
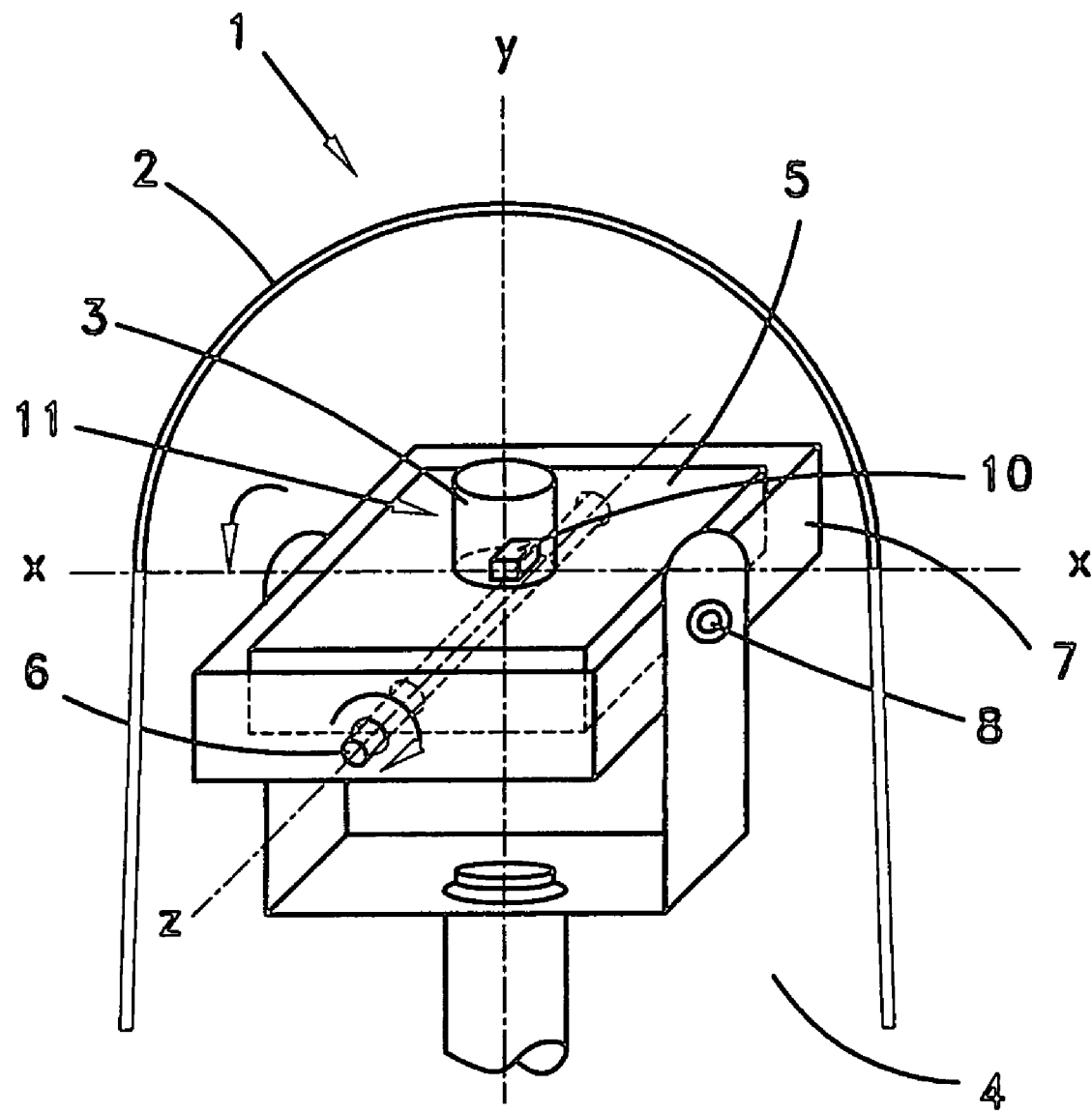
FIG. 1 illustrates generally gimbals-based prior art scanning unit of a missile.

FIG. 1 shows in a general form a scanning unit 1 such as the one conventionally positioned at the front end of a missile. It should be noted that for the sake of brevity, only essential elements are shown, and not to their real size or scale. The scanning unit 1 consists of a sensing element 10 such as a focal plane array. The focal plane array is mounted on a gimbals system 4 which can apply rotation to the focal plane array in at least two degrees of freedom, i.e. rotation about two perpendicular axes, x and z. In operation, this focal plane array scans and acquires images from the front of the missile, which are used for directing the missile to its target. It has been surprisingly found by the inventors that such a scanning unit, with some minor modifications, can form the basis for a submarine periscope. The optical unit 11, which generally comprises optics 3 and a sensing element 10 such as a focal plane array, is mounted on an internal plate 5 of gimbals system 4. The gimbals system 4 comprises an internal plate 5, which is rotatable about a first axis 6 (z-axis) and an external frame 7 which is rotatable, together with said internal plate 5 about a second axis 8 (x-axis). The said first and second axes are perpendicular with one another. The rotations of the plates are performed by means of a servo system (not shown). Altogether, the gimbals system 4 has two degrees of freedom, i.e. rotation about the x-axis and rotation about the y-axis. Moreover, the periscope of the present invention is also provided with inertial navigation system (INS) which also exists in missiles heads. Such INS is used in missiles for determining in real-time the location and orientation of the missile head with respect to a fixed reference point. The INS is particularly used in missiles for stabilizing and compensating the images obtained in view of the missile vibrations during its flight. In the periscope of the present invention such INS also exists, and it is used to compensate the images in view of the vibrations due to the sea waves. A transparent window in the form of a dome 2 encloses the entire unit.

Figure 2:
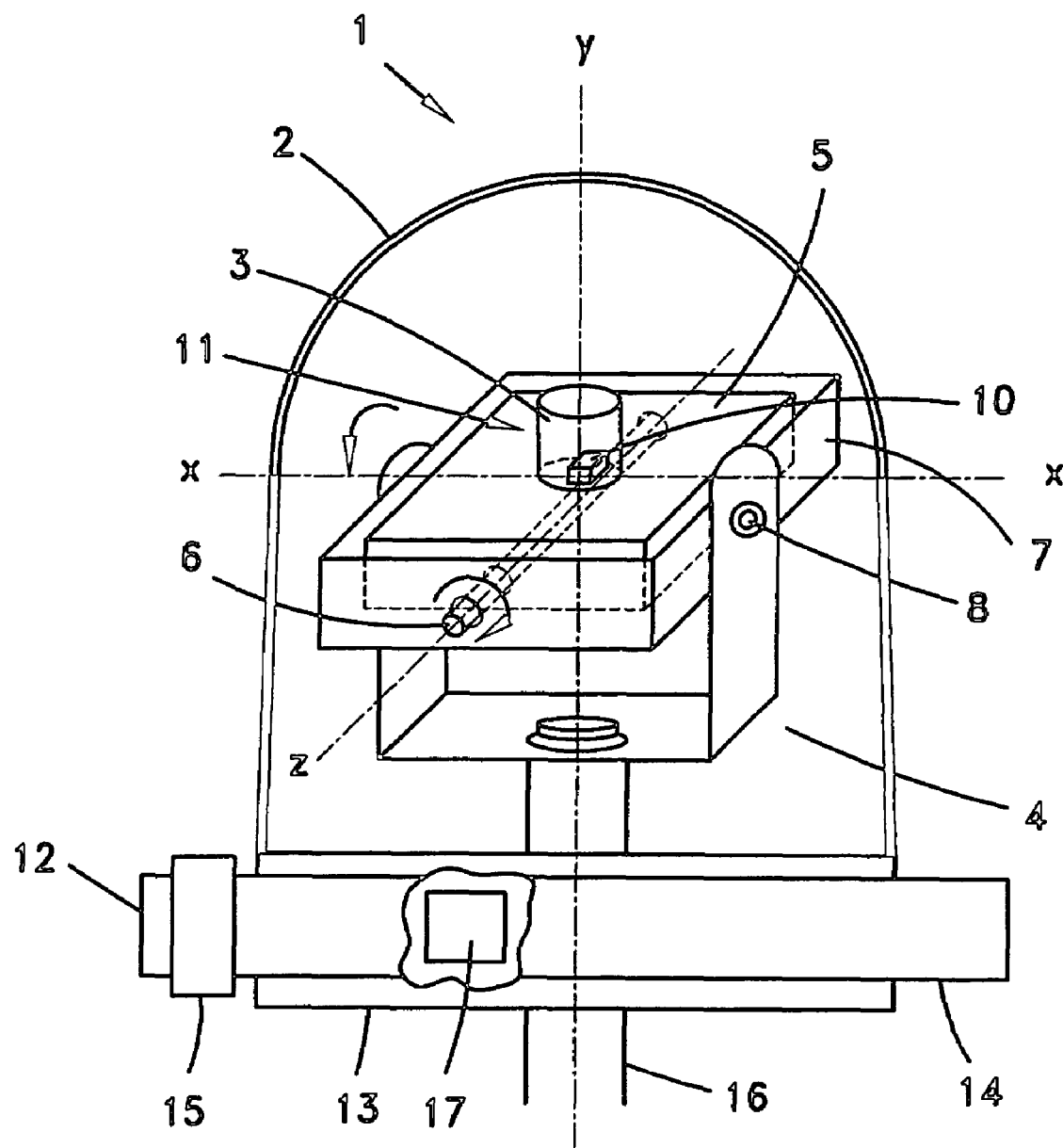
FIG. 2 generally illustrates a periscope, according to an embodiment of the invention.

As said, in a most preferable embodiment of the invention, the top section may be of essentially same configuration as that of a conventional missile head. Thus, the periscope head is already designed and constructed, and has been proven to work according to the desired capabilities. The only additional constraint is to provide to the periscope floating means, to connect it by cable with the submarine, and to provide communication means for communicating images or other data between the periscope and the submarine. FIG. 2 illustrates a periscope according to an embodiment of the invention, and, as most of the periscope components exist also in the scanning unit of the missile as shown in FIG. 1, they were indicated by same numerals.

The periscope scanning unit 1 is adapted to obtain images from very far distances, in the range of, for example up to tens of kilometers. The focal plane array (FPA) 10 can include two or three separate sensing units, such as infrared (IR), ultra violate (UV) or visual imagery. The FPA 10 is preferably situated precisely in the center of the transparent dome 2 surrounding the top portion of the periscope as well as the center of the optics 3 that covers the FPA.

It must be emphasized how important it is for a submarine crew to be capable of determining whether an enemy aircraft is flying above it. Technological advancements have enabled aircrafts to detect, using ultrasonic sensors, and destroy even fully submerged submarines. Thus, a periscope that can provide only one degree of freedom (i.e. that of rotating around only an axis perpendicular to the water surface), such as the periscope disclosed in US 2003/0020829 is at a great disadvantage when compared with a periscope of the present invention which comprises a gimbals system which provides a rotation of the sensing unit about two axes, both being essentially parallel to the water surface. Thus, the present invention enables a 180° hemisphere view above and parallel to the water surface, and essentially to a distance of up to tens of kilometers.

In still another embodiment of the invention, the periscope may have a third degree of freedom, i.e., rotation 24 about axis y (as shown in FIG. 2), essentially perpendicular to the water surface.

As said, the periscope uses the same scanning system as exists in a head of a missile. Such scanning system with its focal plane array is not adapted to obtain a single image of the full hemisphere as is needed by the present invention. The present invention uses the capability of the servo and gimbals to perform scanning of the hemisphere, in which a plurality of images are obtained. For example, if each image covers 30° of the hemisphere, the scanning may require 36 images to cover the full hemisphere. Then, the 36 images that are conveyed to the workstation within the submarine will be "stitched" to a large image covering the full hemisphere. The stitching operation can be performed by image processing techniques also using the data from the INS indicating for each image the direction from which it has been acquired. In any case, in view of the capabilities of the scanning systems as exist in missiles, such hemisphere scanning can be performed in a very short period finally providing a full image of the hemisphere (the sky).

The transparent dome may be made from any conventional transparent material. In a preferable case, it may be made from sapphire having an excellent optical transmission in both the IR and visual range. Additionally, the dome must be strong enough to withstand the water pressure that is exerted on it during its ascent to the surface.

Moreover, the view can alternatively be obtained in IR (by using an IR focal plane array) or in other optical band, or even simultaneously in two distinct optical bands by using more than one focal plane array. The optical unit 3 may be used for focusing purposes in a conventional manner.

The periscope of FIG. 2 further includes a bottom portion 12 which comprises base 13 which is surrounded by a floatation tube, or another conventional floatation means 14.

Figure 3:
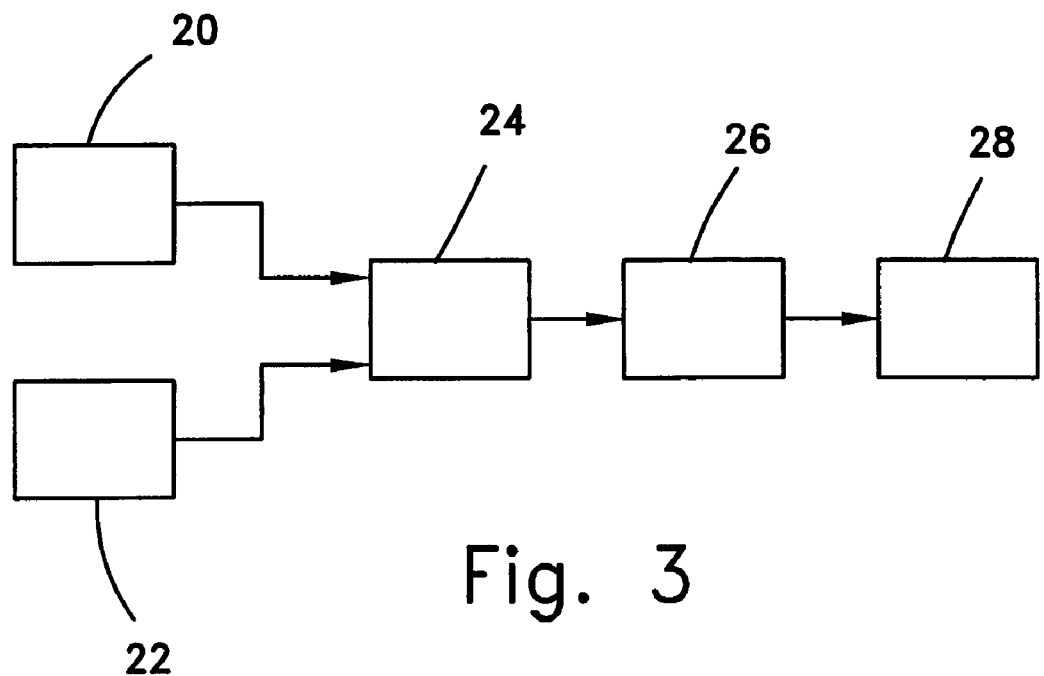
FIG. 3 illustrates a block diagram of the method of capturing and displaying imagery.

An Inertial Navigation System (INS) 15 is affixed to the float, to provide directional and angular orientation information of the periscope and the captured imagery. Additionally, as depicted in the block diagram of FIG. 3, a fully stabilized and compensated picture of the entire hemisphere is generated. After the INS system 20 and the servo 22, respectively directs and orients the periscope to a certain direction, an image is captured 24 and transmitted to the remote workstation. Subsequently, additional images are captured and transmitted to the remote workstation, where the images are pieced together "stitched") via a processing unit 26, and displayed 28 as a unified image. Cables 16 extend from the bottom portion 12 of the periscope and connect to the submarine (not shown).

The cables 16 have multiple functions. Firstly, the cables are utilized as a means for retaining the periscope and preventing it from floating away once it is deployed. Additionally, the cables are used as means for transferring imagery and orientation data from the periscope to the remote workstation within the submarine. The cables also serve as means of providing power to the scanning unit 1, and controlling the gimbals rotation, enabling the focal plane array to rotate along the preferred axes. For example, the operator of the control station may be provided with the capability of directing the focal plane array to a specific direction of interest. Such features and other control features that may be available to the operator are feasible in view of the control wiring that go from the submarine to the periscope and which convey the control signals and data from the submarine to the periscope and vice versa. Lastly, the cables are used as means of determining whether the periscope floats above the surface or is kept submerged below the surface, as may occur in some sea conditions.

Modem 17 is used to modulate the data which is conveyed between the periscope and the submarine. A similar modem exists also in the submarine. In some cases the modem may be a wireless modem, generally operating in the ultrasonic range, to transfer the data without cables. However, this option seems to be less likely, as there exists in any case a cable connected between the submarine and the periscope, therefore maintaining the periscope in the vicinity of the submarine.

Figure 4:
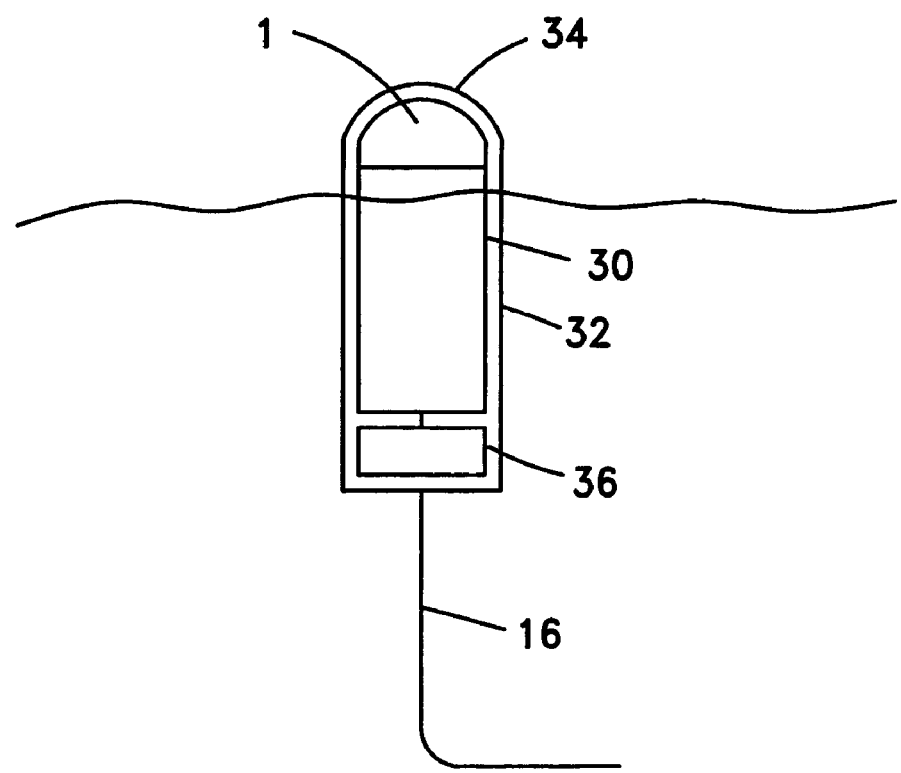
FIG. 4 illustrates an embodiment of the invention in which a missile which is enclosed within a capsule is used as a periscope.

Another embodiment of the present invention is illustrated in FIG. 4 in schematic form, and comprises all the elements of the embodiment as described above, mutatis mutandis, with the following differences. In this embodiment, the periscope consists of an entire prior art missile 30, encased in a capsule 32, shown partially submerged under water. A transparent shield 34, situated at the head of the capsule 32, is fully retractable or optionally transparent. A typical prior art launching mechanism 36 is located at the lower end of the capsule 32. The missile head, having the structure as described above for the periscope of the invention, is utilized as a periscope, for capturing and transmitting data via cables 16 to a remote workstation within the submarine as above. In this embodiment, at the appropriate moment, the missile 30 can be launched from its partially submerged state toward an above-surface target based on the imaging data acquired by the periscope of the invention. It should be noted the a capsule which contains a missile, and which comprises launching means, and which can be released from a submarine, and which has the capability of launching the missile from some distance from the submarine are known in the art. However, the use of a tracking head of a missile, either alone or as a part of a missile was never proposed to be used as a periscope, particularly to obtain an image of the sky hemisphere.

The transparent shield 34, similar to the transparent dome of the missile head, can be made of any conventional transparent material. In a preferable case, it may be made from sapphire having an excellent optical transmission in both the IR and visual range. Additionally, the transparent shield must be strong enough to withstand the water pressure that is exerted on it during its ascent to the surface. Alternatively, the shield may be opaque, but retractable whenever necessary. In such a manner, the missile becomes a dual purpose object. It some times serves the purpose of a floating periscope and at other times it serves as a real missile that can be launched toward a target.

While the forgoing description describes in detail only a few specific embodiments of the invention, it will be understood by those skilled in the art that the invention is not limited thereto and that other variations in form and details may be possible without departing from the scope and spirit of the invention herein disclosed or exceeding the scope of the claims.

The invention claimed is:

1. A submarine floating periscope which comprises:
   a. a floating base;
   b. a scanning unit for scanning and acquiring images of an above water surface hemisphere; and
   c. a cable between a submarine and the periscope for maintaining the periscope above water and in a vicinity of the submarine, and for enabling communication between the periscope and the submarine;
   wherein the scanning unit comprises:
   I. a transparent dome;
   II. a two-degrees of freedom gimbals system positioned in a hollow portion formed below the dome, wherein the gimbals system comprises a mechanism for changing the orientation of a plate within the hollow portion by applying rotation about two perpendicular axes both being essentially parallel to the water surface;
   III. a light sensing element in the form of a focal plane array, for sensing light coming from outside the dome thereby forming images, the sensing unit being positioned on said plate; and
   IV. a modem for transferring images data and other data between the periscope and the submarine.

2. The submarine floating periscope according to claim 1, wherein the gimbals system further comprises a frame, surrounding the plate.

3. The submarine floating periscope according to claim 2, wherein the gimbals system provides movement to the frame and the plate in the following degrees of freedom:
   a. rotation of the frame and the plate together about a first x-axis, wherein the x-axis is parallel to the water surface;
   b. rotation of said plate only about a second z-axis, wherein the z-axis is perpendicular to the x-axis, and parallel to the water surface.

4. The submarine floating periscope according to claim 1, wherein the gimbals system has a third degree of freedom of rotation about a third y-axis, wherein the y-axis is essentially perpendicular to the water surface.

5. The submarine floating periscope according to claim 1, wherein the modem transfers data over a fiber-optic channel within said cable connecting the submarine and the periscope.

6. The submarine floating periscope according to claim 1, wherein the modem transfers data to the submarine wirelessly, in the ultrasonic range.

7. The submarine floating periscope according to claim 1, wherein the focal plane array is in contact with and parallel to the plate.

8. The submarine floating periscope according to claim 1, wherein said acquired images are displayed in a workstation within the submarine.

9. The submarine floating periscope according to claim 1, wherein said scanning unit has essentially the same configuration as that of a conventional missile head.

10. The submarine floating periscope according to claim 1, wherein the base is surrounded by a floatation tube.

11. The submarine floating periscope according to claim 1, wherein a directional stabilizing system is affixed to the base or the scanning unit, in order to acquire and transmit to the submarine direction and orientation data, together with the transmitted images.

12. The submarine floating periscope according to claim 1 wherein said directional and orientation data is used for compensating for vibrations due to environmental conditions occurring during imaging by the scanning unit, or for providing compensation within the gimbals system.

13. The submarine floating periscope according to claim 1 wherein the dome is a portion of a sphere.

14. The submarine floating periscope according to claim 1, wherein the transparent dome is made of a sapphire.

15. The submarine floating periscope according to claim 1, wherein the periscope is a tracking head of a missile, and is an integral portion thereof.

16. The submarine floating periscope according to claim 15, wherein the missile, including the periscope being the tracking head thereof is included within a capsule.

17. The submarine floating periscope according to claim 16, wherein the capsule further includes launching means for launching the missile.

18. The submarine floating periscope according to claim 15, wherein the capsule has a top transparent cover, or a retractable cover which is retracted when the periscope is operative.

19. The submarine floating periscope according to claim 17, wherein the missile can be launched from the capsule following a command given by an operator located within the submarine.

* * * * *